June 24, 1930.                    G. A. HART                    1,765,832
PITMAN
Filed Nov. 21, 1928
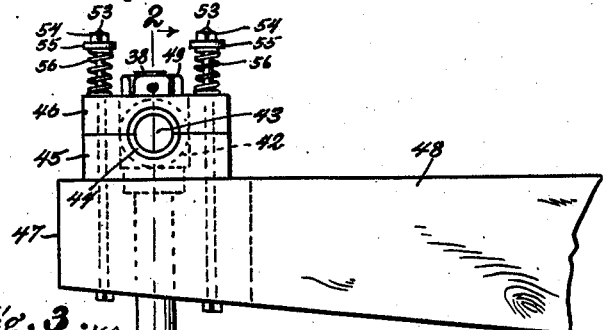
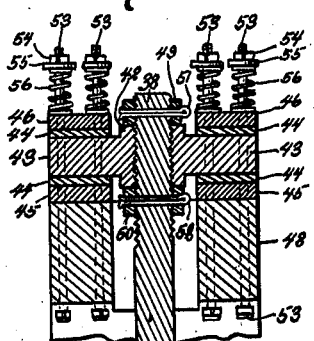
Inventor.
Glen A. Hart.
by
William M. Gentle
His Attorney.

Patented June 24, 1930

1,765,832

UNITED STATES PATENT OFFICE

GLENN A. HART, OF BELL, CALIFORNIA, ASSIGNOR OF ONE-HALF TO BERT L. CULVER, OF BELL, CALIFORNIA

PITMAN

Application filed November 21, 1928. Serial No. 320,933.

This invention relates to improvements in a pitman for operating on a heavy load such as pumping deep wells, and also operating with cable tool drilling of deep wells and the like, and the principal object thereof is to provide a pitman that can operate with a heavy load with a minimized amount of friction. To that end I provide a pitman having a head that is detachably connected to a roller bearing that is secured to the wrist pin of a crank drive shaft with means connected with the head for lubricating the bearing so that the rollers run in oil to reduce friction to a minimum; and also I construct the bearing so that it is dustproof and effectively retains the lubricant. As is well known, deep well operations, especially for oil, accumulate considerable oil and grease that are charged with dust and sand that are very detrimental to the bearings of machinery if penetrated by the dust or sandy residue, and an object of the invention is to provide a bearing that cannot be penetrated by greasy sand or dust.

Another object of the invention is to provide a pitman having a head that can be easily and quickly detached from the drive shaft so that the bearing on the wrist pin of the crank can be used for other purposes, such as operating a jerk line for tightening the joints of deep well pipes. To that end I provide a head having a tapered socket adapted to be fitted over and secured to the tapered outer member of the roller bearing so that the pitman can be easily attached and detached when desired. Also in this connection I attach the upper end of the pitman to the walking beam so that the bearing can yield considerable when the pitman is moved sidewise to place it on or remove it from the bearing.

Another object is to provide a pitman in which all of its parts are effectively secured together so that in use they cannot easily be displaced by heavy work or shock.

A feature of invention is shown in the pivotal mounting of the upper end of the pitman on a walking beam so it can yield when the pitman is moved sidewise to place it on or remove it from the roller bearing.

Features of invention are shown in the construction combination and arrangement of the coacting parts whereby a pitman is provided that is easy to construct, assemble and operate and which is effective and durable in operation.

Other objects, advantages and features of invention may appear from the accompanying drawings, the subjoined detailed description and the appended claims.

The accompanying drawings illustrate the invention.

Fig. 1 is a fragmental side view of a pitman that is constructed in accordance with this invention, showing one end of the pitman connected to the wrist pin by a roller bearing and the other end thereof pivotally and yieldingly connected to a walking beam.

Fig. 2 is a fragmental central vertical section on the line 2—2, Fig. 1, showing the detail construction of the roller bearing for the pitman head and also the connection of the other end of the pitman to the walking beam.

Fig. 3 is a semi-diagrammatic plan view of the roller bearing and crank shaft as utilized for operating a jerk line when the pitman is removed from the bearing, parts shown on a reduced scale and an altered position of parts shown by dotted lines.

Fig. 4 is an enlarged fragmental plan view of the crank shaft and bearing with the pitman removed.

Fig. 5 is a cross section on the line 5—5, Fig. 4.

Fig. 6 is a fragmental section on the line 6—6, Fig. 1, showing the means for holding the head from sidewise movement on the bearing.

The pitman includes a head 10 having a tapered socket 11 that is adapted to fit snugly over the tapered outer member 12 of a roller bearing secured to a wrist pin 13. The inner member 14 of this bearing carries the rollers 15 arranged in the race 16 in the periphery of the inner member 14.

The inner member 14 is arranged and secured between the flange 17 integral with one end of the outer member 12 and an end disk 18 that is secured by stud bolts 19 to one end of the outer member 12, and preferably there is a gasket 20 interposed between the disk 18 and the roller bearing members so that lubricant fed into the roller race will be retained around the rollers 15 and also so that the roller bearing is dustproof.

The wrist pin 13 is secured by a nut 21 to a crank 22 that is integral with the drive shaft 23 fragmentally shown in the drawing, and the roller bearing is secured on the wrist pin 13 by a washer 24 and a cotter pin 25, and preferably a washer 26 is arranged on the pin 13 and interposed between the roller bearing and the crank 22.

When the head 10 is placed on the roller bearing member 12 it is secured in place by a U-bolt 27 that extends downward through guides 28 and also through holes 29 that are drilled through the smaller end of the outer member 12 of the bearing, and the U-bolt is secured in place by the nuts 30 arranged in recesses 31 in the head 10.

The outer member 12 of the bearing is held from rotation in the head 10 by means of a keyway 32 cut in the member 12 and a feather key 33 integral with the head 10.

The roller bearing is lubricated by an oil cup 34 that is secured by a stem 35 to the head through which an oil duct 36 extends from the oil cup to the key in the member 12 and from this keyway a duct 37 leads through the member 12 to the rollers 15 in the race 16, see Figs. 1 and 5.

A pitman rod 38 has its lower end threaded and secured in a socket 39 in the top end of the head 10 and it is secured in place by a nut 40 placed under tension and secured by a cotter pin 41.

The upper end of the rod 38 is threaded through a socket in a hub 42 that is centrally and integral with a cross pin 43 and that has its ends pivotally arranged in bushings 44 secured between bearing blocks 45, 46 aranged on the top side and adjacent the end 47 of a rocking beam 48.

Preferably the rod 38 is additionally secured in the hub 42 by means of the opposing nuts 49, 60 and cotter pins 51, 52, as shown best in Fig. 2.

The top blocks 46 are yieldingly secured on the blocks 45 by pairs of bolts 53 that at their upper ends are provided with nuts 54 and washers 55 and between the washers and the blocks 46 are arranged springs 56 that are under sufficient tension to hold the blocks together under the normal load applied to the pitman.

The springs 56 are arranged to yield slightly at the extreme end of each pitman stroke so as to avoid excessive shock in the reciprocating movement thereof. Also the springs are arranged so as to yield slightly when the head 10 is being moved sidewise either to place the head on or remove it from the roller bearing.

To expedite placing the head on or removing it from the bearing I provide a handle 57 adjacent the lower end of the head by which it can be moved toward or from the bearing.

With the pitman and bearings constructed and arranged as shown they operate with a minimum amount of friction and the strokes of the pitman terminate without excessive shock to the bearings.

Also the construction, combination and arrangement of the parts enable an operator to easily place the pitman head in place for operation or to remove it so that the roller bearing and crank shaft can be used for other purposes, as previously stated.

As shown in Figs. 2 and 4, the outer member 12 of the ball bearing is provided with a centrally arranged annular groove 58 so that a jerk line or cable 59 can be attached to it when the crank shaft 23 is to be used for tightening the joints of deep well pipes as illustrated in Fig. 2.

As seen therein, the jerk line 59 has one end connected to the roller bearing and its other end is connected to a pipe wrench 60 that is manually operated in time with the rotation of the shaft 23. In other words when the shaft is rotated to move the roller bearing from the dotted to the full line position the operator manually moves the wrench from the dotted line to the full line position and when the wrench is so moved its jaws are released from the pipe 61. Then when the shaft moves the roller bearing from its full line to the dotted line position the operator grips the wrench to the pipe so that it is rotated on its axis with great force to tighten the joints of the pipe line, this operation being repeated until the joints are sufficiently tight.

In operation the parts are assembled and operated as shown in the drawing and as previously described.

I claim as my invention:

1. A pitman including a head having a tapered socket, a roller bearing having an outer member tapered to fit into the socket in said head, and a U-bolt supported on guides on said head that is adapted to extend through holes in said outer member for detachably securing said head to said bearing.

2. A pitman including a head having a tapered socket arranged centrally therein, a roller bearing having an outer member tapered to fit into the socket in said head, a U-bolt supported on guides on said head that is adapted to extend through holes in said outer member to prevent sidewise movement of said head, and a key connection between said head and outer member to prevent rotary movement of said member in said head.

3. A pitman including a head having a tapered socket, a roller bearing having an outer member tapered to fit into the socket in said head, a key connection between said head and outer member, a U-bolt detachably securing said head and outer member together so as to prevent sidewise movement of said head, a pitman rod having one end secured to said head, a walking beam, and a pivotal yielding connection at the other end of said rod for securing it to said walking beam.

4. A pitman including a head adapted to be detachably connected to a roller bearing mounted on a wrist pin, a rod having one end secured to said head, a pin secured crosswise to the other end of said rod, bushings in which the ends of said pin are pivotally mounted, a walking beam bearing blocks between which said bushings are secured, said blocks arranged at one end of said walking beam, and means for yieldingly securing said blocks to said beam.

5. A pitman including a head mounted on and detachably secured to the tapered outer member of a roller bearing so it is movable sidewise to detach it from said bearing, a handle for moving said head, a pitman rod having one end secured to said head, a walking beam and a pivotal and yielding connection of the other end of said rod to a walking beam so that said rod and head can move sidewise when said head is placed on or removed from said roller bearing.

In testimony whereof I affix my signature.

GLENN A. HART.